(12) United States Patent
Uchiyama

(10) Patent No.: US 7,675,568 B2
(45) Date of Patent: Mar. 9, 2010

(54) APPARATUS AND METHOD FOR CONTROLLING DIAPHRAGM OF IMAGING APPARATUS

(75) Inventor: Minoru Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 605 days.

(21) Appl. No.: 11/551,384

(22) Filed: Oct. 20, 2006

(65) Prior Publication Data
US 2007/0146537 A1    Jun. 28, 2007

(30) Foreign Application Priority Data
Nov. 7, 2005   (JP) .............................. 2005-322516

(51) Int. Cl.
G03B 7/00 (2006.01)
G03B 7/085 (2006.01)
(52) U.S. Cl. ...................................... 348/362; 396/257
(58) Field of Classification Search ....................... None
See application file for complete search history.

(56) References Cited

U.S. PATENT DOCUMENTS

| 5,325,149 | A | * | 6/1994 | Kawahara ................... 396/259 |
| 5,793,422 | A | * | 8/1998 | Mochizuki et al. .......... 348/296 |
| 5,831,676 | A | * | 11/1998 | Takahashi et al. ........... 348/362 |
| 6,123,466 | A | * | 9/2000 | Persson et al. .............. 396/358 |
| 6,473,126 | B1 | * | 10/2002 | Higashihara et al. ........ 348/345 |

FOREIGN PATENT DOCUMENTS

JP    10-276363 A    10/1998

* cited by examiner

*Primary Examiner*—Lin Ye
*Assistant Examiner*—Euel K Cowan
(74) *Attorney, Agent, or Firm*—Canon U.S.A., Inc., I.P. Division

(57) ABSTRACT

When a difference between a diaphragm target position and a detected state of a diaphragm is less than a neutral zone width, a driving control operation of the diaphragm is prohibited. The neutral zone width can be changed depending on the state of the diaphragm.

6 Claims, 4 Drawing Sheets

APPARATUS AND METHOD FOR CONTROLLING DIAPHRAGM OF IMAGING APPARATUS

BACKGROUND OF THE INVENTION

1. Field of the Invention

The present invention relates to an imaging device, such as a lens apparatus and a camera, which has a diaphragm control mechanism. More specifically, the present invention relates to a control apparatus and a control method capable of accurately controlling a diaphragm and capable of stabilizing a diaphragm action free from a hunting phenomenon.

2. Description of the Related Art

An imaging apparatus, such as a video camera, can include a position servo control mechanism capable of controlling a mechanical diaphragm provided therein. According to a conventional position servo control system, a Hall element can be used as a position sensor detecting the position of diaphragm blades (sectors).

The control system can obtain a difference between an output of the position sensor (the Hall element) and a target position of the diaphragm, and can produce a voltage signal representing the obtained difference. Furthermore, the control system can apply gain adjustment and phase compensation processing to the signal. The voltage signal is supplied to a diaphragm driving coil. The current corresponding to the applied voltage flows in the diaphragm driving coil. As a result, positional changes occur in the blades of the diaphragm and can be recognized as an output change in the position sensor. By repeating the above-described action, the control system can accomplish the diaphragm control.

However, when the position signal includes noises or any change occurs in frequency characteristics (for example, due to change of temperature), the diaphragm may not accurately stop at the target position and the diaphragm may cause a hunting phenomenon in the vicinity of the target position. That is, the diaphragm repeats opening and closing movements. If the servo action period is long, the hunting phenomenon appears as a change in the light quantity. If the servo action period is short, the diaphragm generates action sounds.

To solve this problem, it is possible to provide a neutral zone. According to a conventional technique, when a deviation between a detected diaphragm position and a target diaphragm position is less than a predetermined value, the deviation is regarded as 0 and no driving action is taken. For example, a neutral zone applicable to the exposure control of a camera is discussed in Japanese Patent Application Laid-open No. 10-276363.

Providing a neutral zone is generally effective to eliminate or suppress a hunting phenomenon. The stability of the diaphragm control can be improved. However, if an excessively large neutral zone is set, the deviation increases largely. On the other hand, if the deviation is decreased, the stability deteriorates.

FIG. 2A shows a relationship between an f-number indicating the state of the diaphragm and an output of the Hall element representing the diaphragm position. When the f-number increases discretely (i.e., by the steps of 1.4, 2.0, 2.8, 4.0 . . . ), the light quantity decreases in decrements of ½. However, the output of the Hall element (i.e., the diaphragm position) does not decrease in decrements of ½ and increases and decreases nonlinearly.

When the diaphragm value varies in the vicinity of a fully closed position of the diaphragm blades (refer to F22), a corresponding output change in the Hall element is small. On the other hand, when the diaphragm value varies in the vicinity of a fully opened position of the diaphragm blades (refer to the F1.4), a corresponding output change in the Hall element is large.

Accordingly, if a shifting motion of the diaphragm blades is controlled so as to produce a constant output change in the Hall element, the light quantity change is large in the f-number region corresponding to F22 and small in the f-number region corresponding to F1.4. As a result, as shown in FIG. 2B, the sensitivity in the light quantity change responsive to the position change of the diaphragm blades is high in the f-number region corresponding to F1.4 and low in the f-number region corresponding to F22.

Accordingly, when a neutral zone has a width corresponding to an output change of the Hall element responsive to the position change of the diaphragm blades in the f-number region corresponding to F1.4 (i.e., the region having a lower sensitivity in the light quantity change), the determined neutral zone is excessively wide for the f-number region corresponding to F22. Accordingly, the diaphragm stops with a large deviation in the light quantity when the f-number is equal to F22 or in its vicinity.

Therefore, in light of the aforementioned, it would be desirable to provide an apparatus and technique capable of setting an appropriate neutral zone for a diaphragm control apparatus and an optical apparatus including the diaphragm control apparatus.

SUMMARY OF THE INVENTION

Embodiments of the present invention are directed to a technique capable of overcoming or at least mitigating the above-described problems. An exemplary embodiment is directed to a technique capable of setting an appropriate neutral zone for a diaphragm control apparatus and an optical apparatus including the diaphragm control apparatus.

According to an aspect of the present invention, a diaphragm control apparatus is provided which includes a diaphragm unit having movable diaphragm blades, wherein the diaphragm unit is configured to control the positioning of the diaphragm blades to adjust a quantity of light passing through the diaphragm unit. The diaphragm control apparatus further includes a diaphragm state detection unit configured to detect a state of the diaphragm unit; a diaphragm state designation unit configured to designate a target position for the diaphragm blades to be positioned thereto; and a control unit configured to perform a driving control operation by the diaphragm unit based on a difference between an output of the diaphragm state detection unit and the target position. The control unit is configured to set a neutral zone for prohibiting the driving control operation when the difference is less than a defined amount, and the neutral zone is determined based on a detected state of the diaphragm unit.

According to another aspect of the present invention, the diaphragm control apparatus, the neutral zone is proportional to light quantity sensitivity calculated based on the state of the diaphragm unit.

According to yet another aspect of the present invention, an optical system is provided which includes a diaphragm unit having movable diaphragm blades; a diaphragm driving unit configured to control the positioning of the diaphragm blades to adjust a quantity of light passing through the diaphragm unit; a diaphragm state detection unit configured to detect a state of the diaphragm unit; a diaphragm state designation unit configured to designate a target position for the diaphragm blades to be positioned thereto; and a control unit configured to perform a driving control operation by the diaphragm unit based on a difference between an output of the diaphragm state detection unit and the target position, and prohibit the driving control operation when the difference is within a neutral zone, wherein the neutral zone is determined based on a detected state of the diaphragm unit.

According to still yet another aspect of the present invention, a method is provided for controlling a diaphragm unit having movable diaphragm blades, wherein the diaphragm unit configured to control the position of the diaphragm blades to adjust a quantity of light passing through the diaphragm unit. Here, the method includes designating a target position for the diaphragm blades to be positioned thereto; detecting a state of the diaphragm unit; performing a driving control operation by the diaphragm unit based on a difference between the detected state of the diaphragm unit and the target position, prohibiting the driving control operation of the diaphragm unit when the difference is within a neutral zone, and changing the neutral zone according to the state of the diaphragm unit.

And additionally, according to still yet another aspect of the present invention, a computer readable medium is provided which contains computer-executable instructions for controlling a diaphragm unit having movable diaphragm blades, the diaphragm unit configured to control the position of the diaphragm blades to adjust a quantity of light passing through the diaphragm unit. More specifically, the computer readable medium includes computer-executable instructions for designating a target position for the diaphragm blades to be positioned thereto; computer-executable instructions for detecting a state of the diaphragm unit; computer-executable instructions for performing a driving control operation by the diaphragm unit based on a difference between the detected state of the diaphragm unit and the target position, computer-executable instructions for prohibiting the driving control operation of the diaphragm unit when the difference is within a neutral zone, and computer-executable instructions for changing the neutral zone according to the state of the diaphragm unit.

Further embodiments, aspects and features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments, features and aspects of the present invention and, together with the description, serve to explain the principles of the invention.

DETAILED DESCRIPTION OF THE EMBODIMENTS

Figure 1:
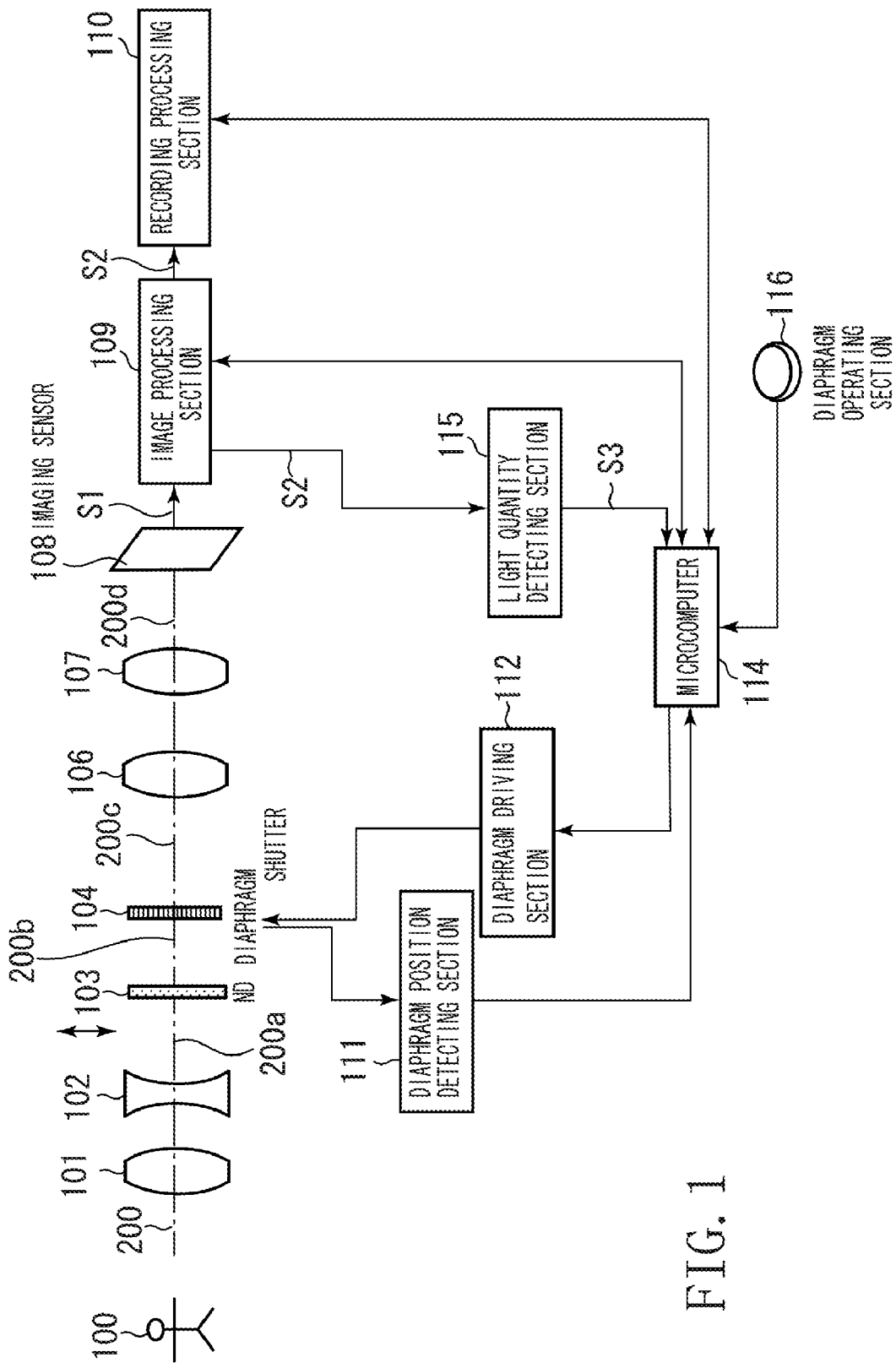
FIG. 1 is a schematic diagram illustrating an imaging apparatus in accordance with an exemplary embodiment.
Figure 2A:
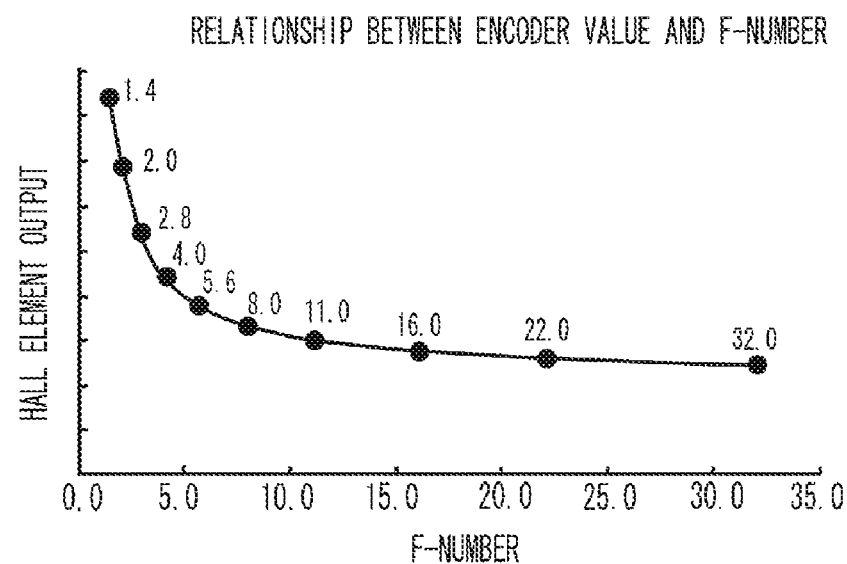
FIG. 2A is a graph showing a relationship between an encoder value and an f-number of a diaphragm.
Figure 2B:
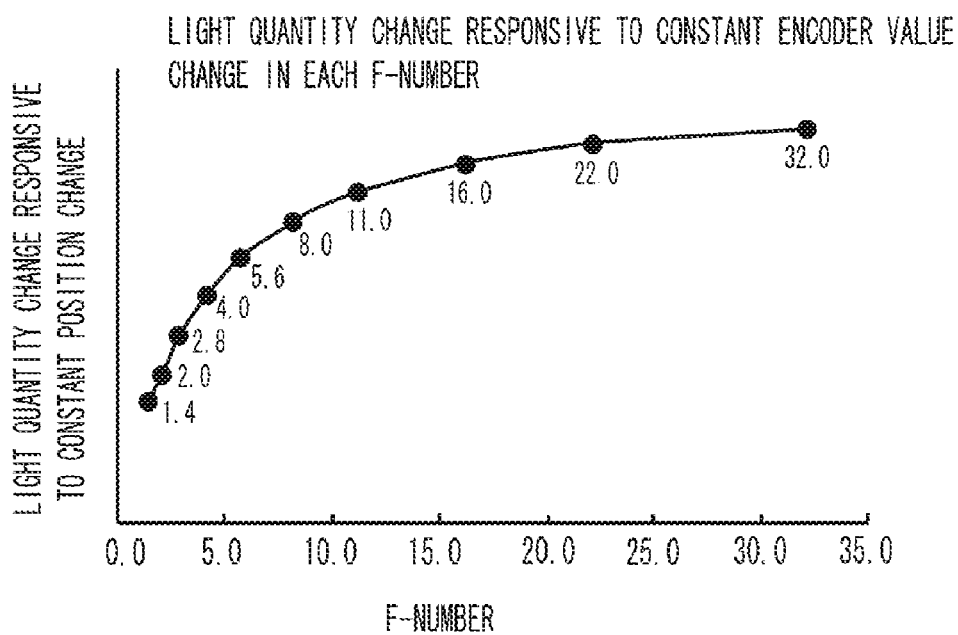
FIG. 2B is a graph showing a light quantity change responsive to a constant change in encoder value in relation to the F-number.

The following description of exemplary embodiments, features and aspects of the present invention is merely illustrative in nature and is in no way intended to limit the invention, its application, or uses.

It is noted that throughout the specification, similar reference numerals and letters refer to similar items in the following figures, and thus once an item is defined in one figure, it may not be discussed for following figures.

An exemplary embodiment will be described in detail below with reference to the drawings.

FIG. 1 is an example of an optical apparatus (imaging apparatus) having a diaphragm control apparatus in accordance with an exemplary embodiment.

First, light 200 arriving from an object 100 enters into an optical system, in which the light 200 successively passes through a stationary lens unit 101 and a zoom lens unit 102. An ND filter 103, provided at a rear side of the zoom lens unit 102, can move in a direction perpendicular to the optical axis of a light flux 200a. In other words, the light quantity is variable depending on the position of the ND filter 103.

The light 200b having passed through the ND filter 103 enters into a diaphragm 104. The blades (sectors) of the diaphragm 104, mechanically causing a shift motion, can adjust the light quantity to a desired value. The light 200c, adjusted to a desired light quantity value, successively passes through another stationary lens unit 106 and a focusing lens unit 107. The light forms an image of the object on an image sensor 108, such as an interlace CCD, provided in a camera body. The imaging sensor 108 can convert the image-formed light 200d into an electric signal S1.

An image processing section 109 can apply AGC (automatic gain control) processing and color adjustment processing to the electric signal S1. A recording processing section 110 can input a video signal S2 supplied from the image processing section 109 and can record the video signal S2 into a recording medium.

A light quantity detecting section 115 can determine whether the present video signal S2 has an appropriate light quantity, based on the video signal S2 produced from the image processing section 109. The light quantity detecting section 115 can produce a detection evaluation signal S3 to a microcomputer 114. The detection evaluation signal S3 represents an evaluation value of the light 200d entering the imaging sensor 108.

The microcomputer 114 can calculate control data for an auto iris control action based on the data of the signal S3 sent from the light quantity detecting section 115. The microcomputer 114 can also calculate control data for a diaphragm control action based on an f-number being set by a user though a diaphragm operating section 116. A diaphragm state detecting unit 111 can detect a present position of the diaphragm blades of the diaphragm 104. A diaphragm driving section 112 can change the position of the diaphragm blades.

The microcomputer 114 calculates a shift amount and a control direction of the diaphragm blades to optimize the light quantity value, with reference to the detection evaluation value measured by the light quantity detecting section 115. The diaphragm driving section 112 can perform a position servo action for the diaphragm blades to adjust the light quantity entering the imaging sensor 108. By repeating the above-described sequential operations starting from the evaluation of the detected light to the actuation of the diaphragm blades, the optical apparatus can realize an optimum light quantity control.

Figure 3:
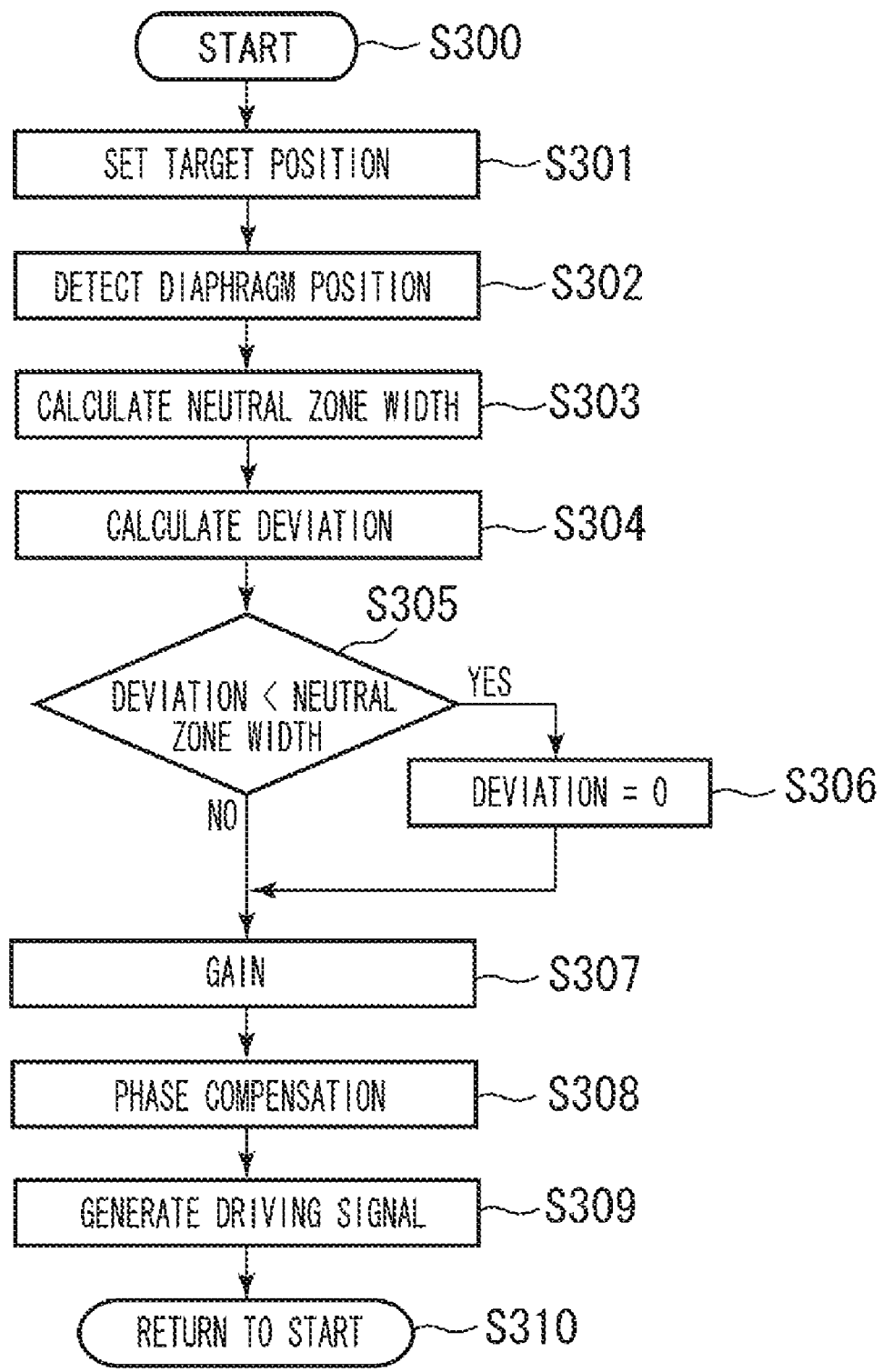
FIG. 3 is a flowchart showing an example of diaphragm control in accordance with an exemplary embodiment.

The optical apparatus according to the exemplary embodiment can perform diaphragm control when a user sets a predetermined stationary f-number using the diaphragm operating section 116. FIG. 3 is a flowchart showing an example of diaphragm control in accordance with an exemplary embodiment.

Referring to FIG. 3, the diagram control starts at step S300. First, the diaphragm operating section 116 performs processing for detecting a diaphragm value set by a user and setting a target position based on the detected diaphragm value (refer to step S301). Next, the diaphragm position detecting section 111 performs processing for detecting the present position of the diaphragm 104 by using the Hall element (refer to step S302). Next, the microcomputer 114 calculates an f-number of the diaphragm based on the diaphragm position information obtained in the step S302.

Figure 4:
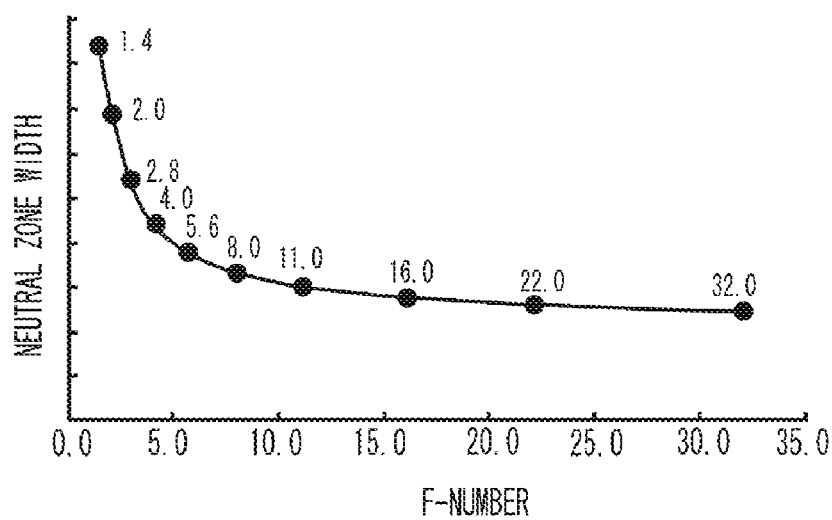
FIG. 4 is a graph showing a relationship between the f-number and a neutral zone width according to an exemplary embodiment.

Furthermore, the microcomputer 114 stores, in its memory, a relationship between the f-number and a neutral zone width shown in FIG. 4 as representative data. The microcomputer 114 can obtain any intermediate value between representative data based on interpolation calculations, and can calculate a corresponding neutral zone width of the diaphragm (refer to step S303). The neutral zone based on an output of the Hall element is set to be a large width when an aperture of the diaphragm is large and a small width when the aperture is small.

Next, the microcomputer 114 calculates a deviation between a target position of the diaphragm and the present diaphragm position and determines the control direction based on the calculated deviation (refer to step S304). Next, the microcomputer 114 compares the calculated deviation to the neutral zone width (refer to step S305). When the neutral zone width is larger than the deviation (YES in step S305), the microcomputer 114 sets the deviation to 0 (refer to step S306). When the neutral zone width is not larger than the deviation (NO in step S305), the processing flow proceeds to step S307.

Next, the microcomputer 114 multiplies the deviation by an appropriate gain (refer to step S307), and performs phase compensation processing to calculate a control amount (refer to step S308). The microcomputer 114 converts the obtained control amount and the direction into control voltages and produces an appropriate driving signal (refer to step S309). Then the in step S310, the process returns to the start at step S310. By repeating the above-described sequential operations, the microcomputer 114 can accomplish the position servo control for the diaphragm.

Figure 5A:
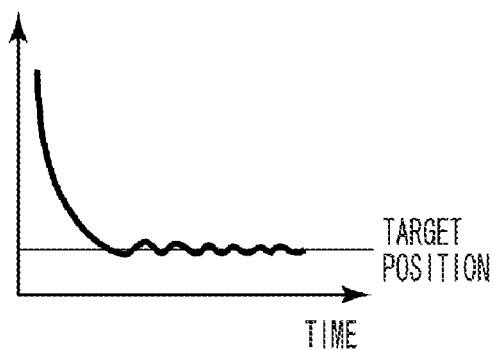
FIGS. 5A and 5B are graphs showing an effect of a neutral zone in practical diaphragm control in accordance with an exemplary embodiment.
Figure 5B:
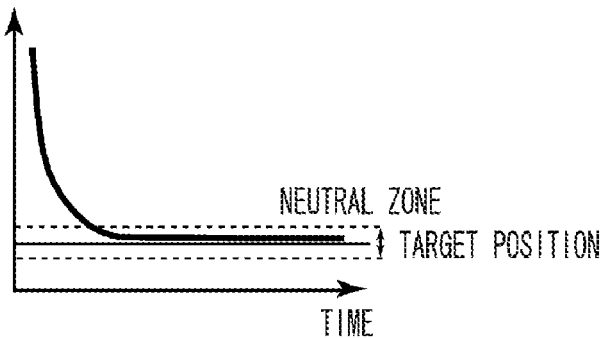

As described above, when no neutral zone is provided, an undesirable hunting phenomenon occurs in the vicinity of the target position as shown in FIG. 5A. However, when an appropriate neutral zone is provided, no hunting phenomenon occurs as shown in FIG. 5B. While in some cases, the diaphragm may not stop at the target position as shown in FIG. 5B, the neutral zone width can be set to an appropriate value so as to correspond to the light quantity change. Thus, a deviation relative to the target light quantity can be suppressed within an allowable range regardless of the position of the diaphragm.

Furthermore, software program code for realizing the functions of the above-described exemplary embodiment can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiment. The equivalents of programs can be used if they possess comparable functions. Accordingly, when the functions or processes of the exemplary embodiment are realized by a computer, program code installed in the computer and a recording medium storing the program are used to implement the present invention.

In other words, the present invention encompasses a computer program that can realize the functions or processes of the exemplary embodiment or any recording medium that can store the program. In this case, the type of program can be any one of object code, interpreter program, and OS script data.

A recording medium supplying the program can be selected from any one of a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Moreover, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiment can be realized.

Furthermore, not only the functions of the above-described exemplary embodiment can be realized by a computer that executes the programs, but also an operating system (OS) running on the computer can execute part or all of the actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiment can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-322516 filed Nov. 7, 2005, which is hereby incorporated by reference herein in its entirety.

What is claimed:

1. A diaphragm control apparatus comprising:
   a diaphragm unit having movable diaphragm blades, the diaphragm unit configured to control the positioning of the diaphragm blades to adjust a quantity of light passing through the diaphragm unit;
   a diaphragm state detection unit configured to detect a state of the diaphragm unit;
   a diaphragm state designation unit configured to designate a target position for the diaphragm blades to be positioned thereto; and
   a control unit configured to perform a driving control operation by the diaphragm unit based on a difference between an output of the diaphragm state detection unit and the target position,
   wherein the control unit is configured to set a neutral zone for prohibiting the driving control operation when the difference is less than a defined amount, and the neutral zone is determined based on a detected state of the diaphragm unit.

2. The diaphragm control apparatus according to claim 1, wherein the neutral zone is proportional to light quantity sensitivity calculated based on the state of the diaphragm unit.

3. The diaphragm control apparatus according to claim 1, wherein the neutral zone is determined so that the larger an aperture of the diaphragm is, the larger the neutral zone is set to be.

4. An optical system comprising:
   a diaphragm unit having movable diaphragm blades;
   a diaphragm driving unit configured to control the positioning of the diaphragm blades to adjust a quantity of light passing through the diaphragm unit;
   a diaphragm state detection unit configured to detect a state of the diaphragm unit;
   a diaphragm state designation unit configured to designate a target position for the diaphragm blades to be positioned thereto; and
   a control unit configured to perform a driving control operation by the diaphragm unit based on a difference between an output of the diaphragm state detection unit and the target position, and prohibit the driving control operation when the difference is within a neutral zone, wherein the neutral zone is determined based on a detected state of the diaphragm unit.

5. A method for controlling a diaphragm unit having movable diaphragm blades, the diaphragm unit configured to control the position of the diaphragm blades to adjust a quantity of light passing through the diaphragm unit, the method comprising:
   designating a target position for the diaphragm blades to be positioned thereto;
   detecting a state of the diaphragm unit;
   performing a driving control operation by the diaphragm unit based on a difference between the detected state of the diaphragm unit and the target position,
   prohibiting the driving control operation of the diaphragm unit when the difference is within a neutral zone, and
   changing the neutral zone according to the state of the diaphragm unit.

6. A computer recording medium containing computer-executable instructions for controlling a diaphragm unit having movable diaphragm blades, the diaphragm unit configured to control the position of the diaphragm blades to adjust a quantity of light passing through the diaphragm unit, the computer readable medium comprising: computer-executable instructions for designating a target position for the diaphragm blades to be positioned thereto; computer-executable instructions for detecting a state of the diaphragm unit; computer-executable instructions for performing a driving control operation by the diaphragm unit based on a difference between the detected state of the diaphragm unit and the target position, computer-executable instructions for prohibiting the driving control operation of the diaphragm unit when the difference is within a neutral zone, and computer-executable instructions for changing the neutral zone according to the state of the diaphragm unit.

* * * * *